(12) United States Patent
Kobayashi et al.

(10) Patent No.: US 7,563,736 B2
(45) Date of Patent: Jul. 21, 2009

(54) OPTICAL GLASS AND PROCESS FOR PRODUCING OPTICAL ELEMENT

(75) Inventors: Tomoyuki Kobayashi, Kitakyushu (JP); Jun Sasai, Yokohama (JP); Syuji Matsumoto, Yokohama (JP); Naoki Sugimoto, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 261 days.

(21) Appl. No.: 11/411,177

(22) Filed: Apr. 26, 2006

(65) Prior Publication Data

US 2006/0194686 A1 Aug. 31, 2006

Related U.S. Application Data

(63) Continuation of application No. PCT/JP2004/015702, filed on Oct. 22, 2004.

(30) Foreign Application Priority Data

Oct. 30, 2003 (JP) .............................. 2003-370522

(51) Int. Cl.
  *C03C 3/15* (2006.01)
  *C03C 3/155* (2006.01)
(52) U.S. Cl. ............................. 501/50; 501/41; 501/49; 501/51
(58) Field of Classification Search .................. 501/41, 501/49, 50, 51
  See application file for complete search history.

(56) References Cited

U.S. PATENT DOCUMENTS

| | | | | | |
|---|---|---|---|---|---|
| 4,732,875 | A | * | 3/1988 | Sagara ......................... | 501/42 |
| 6,653,251 | B2 | * | 11/2003 | Sugimoto et al. ............. | 501/78 |
| 7,033,966 | B2 | * | 4/2006 | Kobayashi et al. ............ | 501/41 |
| 7,098,158 | B2 | * | 8/2006 | Natsugari et al. ............. | 501/78 |
| 2003/0191006 | A1 | * | 10/2003 | Natsugari et al. ............. | 501/49 |
| 2004/0235634 | A1 | * | 11/2004 | Kobayashi et al. ............ | 501/41 |

FOREIGN PATENT DOCUMENTS

| | | |
|---|---|---|
| JP | 62-100449 | 5/1987 |
| JP | 04-292435 | 10/1992 |
| JP | 08-290936 | 11/1996 |
| JP | 10-316448 | 12/1998 |
| JP | 2000-016830 | 1/2000 |
| JP | 2003-252647 | 9/2003 |
| JP | 2004-043294 | 2/2004 |

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, P.C.

(57) ABSTRACT

An optical glass which has an internal transmittance to a light having a wavelength of 400 nm being at least 90% as calculated in a thickness of 1 mm and which contains at least 25 mol % of $B_2O_3$ and from 0.1 to 20 mol % of $TeO_2$. The above optical glass which contains $La_2O_3$. The above optical glass wherein the glass transition point $\leq 650°$ C. and the refractive index at 633 nm $\geq 1.70$. A process for producing an optical element made of the above optical glass, which comprises dropping the optical glass in a molten state from a flow outlet of a flow out pipe made of a platinum alloy to form a preform and subjecting it to precision press-molding.

14 Claims, No Drawings

OPTICAL GLASS AND PROCESS FOR PRODUCING OPTICAL ELEMENT

BACKGROUND OF THE INVENTION

1. Field of the Invention

The present invention relates to an optical glass suitable for precision press-molding and a process for producing an optical element (such as a lens) made of the optical glass.

2. Discussion of Background

Recording on an optical recording medium such as CD is carried out by making a laser beam a parallel ray by a collimating lens and condensing the ray by an object lens.

The lens to be used for such an application is usually spherical or aspherical, and is prepared by heating a glass or resin preform to a softening temperature, followed by precision press-molding.

In a case where a lens is prepared by subjecting glass to precision press-molding, a glass preform is prepared usually by dropping a molten glass from a flow outlet of a flow out pipe made of platinum or a platinum alloy (hereinafter they will generically be referred to as platinum or the like). In such a case, a phenomenon such that the molten glass is wetly attached to the outside of the end of the flow outlet of the flow out pipe, and intensified striae of the preform and an increase in the fluctuation of mass of the preform by the phenomenon, are known.

Paying attention to that the above phenomenon is attributable to a small contact angle between the molten glass and platinum or the like, a glass with which the contact angle can be increased has been proposed (Japanese Patent No. 3270022).

In recent years, reduction in size of glass lenses produced by precision press-molding is increasingly in progress. As a result, a preform to be used for production of an object lens for pickup for DVD has an extremely light weight at a level of several dozen mg to several hundred mg. Accordingly, the diameter at the end of the flow outlet becomes smaller, and the above phenomenon that the molten glass is wetly attached to the end becomes remarkable, and the fluctuation of mass of the preform further increase, such being problematic.

However, the above mentioned glass with which the contact angle can be increased (hereinafter referred to as conventional glass) is not sufficient to dissolve the above problems, and a glass with which the contact angle can be more increased has been desired.

Further, as a lens to be used for e.g. DVD employing a blue laser (hereinafter referred to as blue DVD), a lens having a high refractive index, a large Abbe number and a high transmittance to a light having a wavelength of 400 nm, has been desired.

If a lens has a low refractive index, the numerical aperture tends to be small, and when the lens is used as an object lens for example, the distance between the lens and the surface of a recording medium tends to be very short, whereby it is very possible that the lens and the recording medium are in contact.

Further, if a lens has a small Abbe number, the wavelength dispersion tends to be remarkable, and the light may not be focused at the time of the laser wavelength drift.

Further, if the above transmittance of a lens is low, the laser beam intensity to be applied to a recording portion of a recording medium tends to be insufficient and the irradiation time has to be long, and the reading and writing rates may be thereby low.

However, the conventional glass contains $SiO_2$ and $B_2O_3$ and is characterized in that the content ratio $SiO_2/B_2O_3$ as represented by mass percentage is higher than 0.78, and is unsatisfactory for meeting the above requirements. That is, since it contains $SiO_2$ and thereby has a high glass transition point (Tg), the $Li_2O$ content has to be increased so that Tg will not be high, and as a result, problems may arise such that its refractive index will decrease or it is likely to be devitrified. Further, if $TiO_2$ or $Nb_2O_5$ is added so as to increase the refractive index without increasing Tg, a problem may arise such that the transmittance at a wavelength in the vicinity of 400 nm will decrease.

SUMMARY OF THE INVENTION

Under these circumstances, it is an object of the present invention to provide an optical glass which dissolves the above problems and a process for producing an optical element.

The present invention provides an optical glass which has an internal transmittance to a light having a wavelength of 400 nm being at least 90% as calculated in a thickness of 1 mm and which contains at least 25 mol % of $B_2O_3$ and from 0.1 to 20 mol % of $TeO_2$.

The present invention further provides a process for producing an optical element made of the above optical glass, which comprises dropping the optical glass in a molten state from a flow outlet of a flow out pipe made of platinum or a platinum alloy to form a preform and subjecting this preform to precision press-molding to form an optical element.

The present inventors have found that by incorporating $TeO_2$ in an optical glass applicable to the above-described use, the contact angle formed by the glass in a molten state and platinum or the like can be increased, and accomplished the present invention.

According to the present invention, an optical glass which forms a large contact angle with platinum or the like can be obtained, and by such an optical glass, the fluctuation of mass can be reduced even in the case of a light preform, and the preform preparation efficiency can be increased.

Further, according to the present invention, it is possible to increase the above contact angle even with respect to an optical glass containing no $SiO_2$, and it is possible to increase the refractive index, the transmittance at a wavelength of 400 nm and the Abbe number.

DETAILED DESCRIPTION OF THE PREFERRED EMBODIMENT

The optical glass of the present invention (hereinafter referred to as the glass of the present invention) has an internal transmittance ($T_{400}$) to a light having a wavelength of 400 nm being preferably at least 95%, more preferably at least 98%, as calculated in a thickness of 1 mm.

The transmittance T to a light having a wavelength λ as calculated in a thickness of 1 mm is measured, for example, as follows.

Using two sample plates having a size of 2 cm×2 cm and thicknesses of 1 mm and 5 mm, both sides of which are mirror-polished, the transmittance to a light having a wavelength λ is measured by using a spectrophotometer U-3500 (tradename), manufactured by Hitachi Ltd. T is calculated from the following formula, where $T_1$ and $T_5$ are transmittances of sample plates having thicknesses of 1 mm and 5 mm, respectively, obtained by the measurement:

$$T=100\times\exp[(2/3)\times\log_e(T_5/T_1)]$$

The glass of the present invention preferably has a minimum internal transmittance ($T_{min}$) to a light having a wavelength of from 400 to 800 nm as calculated in a thickness of 1 mm being preferably at least 97%. If $T_{min}$ is less than 97%, the glass may hardly be used as a general-purpose lens for use with visible light or as a wavelength-compatible optical recording lens. For example, when it is to be used as an object lens for blue DVD, $T_{min}$ is preferably at least 98%, more preferably at least 99%.

The glass of the present invention preferably has a refractive index (n) to a light having a wavelength of 633 nm being preferably at least 1.70. If n is less than 1.70, it may be difficult to obtain an object lens which is so thin as to be applicable to recording on an optical recording medium and which also has a desired numerical aperture. n is more preferably at least 1.78.

The glass of the present invention has an Abbe number ($v_d$) of preferably at least 35. If $v_d$ is less than 35, it may hardly be used as an object lens for blue DVD. $v_d$ is more preferably at least 40, and typically at most 55.

The glass of the present invention has Tg of preferably at most 650° C. If Tg exceeds 650° C., the press-molding temperature tends to be too high, whereby a mold to be used for the precision press-molding may hardly be used repeatedly. Tg is more preferably at most 630° C., particularly preferably at most 560° C.

The contact angle (θ) formed by the glass of the present invention in a molten state at a temperature higher by at least 20° C. than the liquid phase temperature ($T_L$), and platinum, is preferably at least 65°. If θ is less than 65°, the fluctuation of mass of a preform, for example, to be used for production of an object lens for pickup by precision press-molding, tends to be too large, whereby the preform preparation efficiency may decrease. θ is more preferably at least 80°. In order to prevent a volatile component such as B (boron) from being volatilized from the glass and to prevent the measured value θ being influenced by the volatilization, it is preferred that the difference between the temperature at which θ is measured and $T_L$ is typically 100° C. or smaller, and that the time until measurement of θ is completed after the glass temperature is increased and reaches $T_L$ is typically at most 2 minutes.

θ is measured, for example, as follows.

A 4 mm×4 mm×4 mm block glass sample is put on a platinum plate, which is put in a floating zone furnace and heated to a predetermined measurement temperature. A portion where the molten glass and the platinum plate are contacted at the measurement temperature is observed through an observation window provided on the wall of the furnace to measure the contact angle. The difference between the measurement temperature and $T_L$ is typically 100° C. or smaller.

The glass of the present invention is melted and prepared typically at a temperature of at least 100° C., and for melting, usually e.g. a crucible made of platinum or the like is used.

Now, the components and their contents of the glass of the present invention will be described below, with mol % simply represented by %. In the following, for example, "the glass X contains 20 mol % of $TeO_2$" means that "the glass X contains Te with a content of 20 mol % assuming that Te is present in the form of $TeO_2$". Further, the content as represented by mol % is calculated assuming that when the glass contains a multivalent element, the multivalent element is present in the form of an oxide with the smallest valency, and e.g. a halogen element which does not usually form an oxide is present in the form of atoms.

$B_2O_3$ is a component to prevent the increase in Tg, to make the precision press-molding possible or for another purpose and is essential. If its content is less than 25 mol %, Tg tends to be too high. The $B_2O_3$ content is preferably at least 30 mol %.

Further, the content is preferably at most 70%. If the $B_2O_3$ content exceeds 70%, n may be small, or chemical durability such as water resistance may decrease, and it is more preferably at most 65%.

$TeO_2$ is a component to increase θ and is essential. If the $TeO_2$ content is less than 0.1%, θ will not be sufficiently large. The content is preferably at least 0.5%, more preferably at least 1%, particularly preferably at least 1.5%. In a case where it is desired to make θ particularly large, for example, 86° or larger, the $TeO_2$ content is preferably at least 3%. If the $TeO_2$ content exceeds 20%, $v_d$ may be too small, or the glass may be significantly colored when the glass is melted employing e.g. a crucible made of platinum. The content is preferably at most 15%, more preferably at most 10%.

$La_2O_3$ is not essentLial, but is preferably incorporated in a case where it is desired to increase n without incorporating PbO or to make $v_d$ large.

When $La_2O_3$ is contained, its content is preferably from 1 to 35%. If the $La_2O_3$ content is less than 1%, n or $v_d$ may be small, and the content is more preferably at least 5%, particularly preferably at least 12%. If the $La_2O_3$ content exceeds 35%, the glass is less likely to be vitrified or Tg may be high, and it is more preferably at most 30%, furthermore preferably at most 25%, particularly preferably at most 20%, most preferably at most 17%.

ZnO is not essential, but may be incorporated to stabilize the glass or for another purpose. When ZnO is contained, its content is preferably at least 5% and at most 25%. If the ZnO content is less than 5%, the effect of stabilizing glass may be insufficient, and the content is preferably at least 7%. If the ZnO content exceeds 25%, Tg may be high, and the content is more preferably at most 20%, furthermore preferably at most 18%, particularly preferably at most 18%, most preferably at most 12%.

$SiO_2$ is not essential, but may be incorporated to stabilize the glass or for another purpose. When $SiO_2$ is incorporated, its content is preferably at most 15%. If the $SiO_2$ content exceeds 15%, Tg may be high, and the content is more preferably at most 10%.

$GeO_2$ is not essential, but may be incorporated to stabilize the glass, to make n large, to suppress devitrification at the time of forming or for another purpose. When $GeO_2$ is incorporated, its content is preferably at least 1% or at most 20%. If the $GeO_2$ content is less than 1%, the effect of stabilizing the glass may be insufficient, and the content is more preferably at least 3%. If the $GeO_2$ content exceeds 20%, Tg may be high, and the content is more preferably at most 15%.

When $SiO_2$ and $GeO_2$ are incorporated, the total content is preferably at most 20%, more preferably at most 10%.

When $B_2O_3$ and $GeO_2$ are incorporated, the total content is preferably from 30 to 70%.

$Li_2O$ is not essential, but may be incorporated to stabilize the glass, to decrease Tg or for another purpose. When $Li_2O$ is incorporated, its content is preferably at least 1% or at most 15%. If the $Li_2O$ content is less than 1%, the effect of stabilizing the glass may be insufficient. If the $Li_2O$ content exceeds 15%, the glass may be likely to be devitrified, and the content is more preferably at most 10%, particularly preferably at most 8%.

None of $Na_2O$, $K_2O$, $Rb_2O$ and $Cs_2O$ is essential, but they may be incorporated to lower the glass melting temperature or for another purpose. When one or more of them is incorporated, the total content is preferably at most 10%. If the total content exceeds 10%, the glass may be unstable, or n or the hardness may be small. In the case where it is desired to increase the hardness or to improve chemical durability, preferably none of them is incorporated.

None of MgO, CaO, SrO and BaO is essential, but they may be incorporated to stabilize the glass, to adjust n or the density or for another purpose. When one or more of them is incorporated, the total content is preferably at most 20%. If the total content exceeds 20%, the glass may be rather unstable, or n may be small, and the total content is more preferably at most 15%.

None of $ZrO_2$, $In_2O_3$, $Gd_2O_3$ and $Ta_2O_5$ is essential, but they may be incorporated to increase n without lowering $T_{400}$ or $T_{min}$ or for another purpose. When one or more of them is incorporated, the total content is preferably at most 40%. If the total content exceeds 40%, the glass may be unstable, and the total content is preferably at most 25%, more preferably at most 20%.

Neither of $Nb_2O_5$ and $WO_3$ is essential, but they may be incorporated to make n large or for another purpose. When $Nb_2O_5$ or $WO_3$ is incorporated, the total content is preferably at most 15%. If the total content exceeds 15%, the glass may be unstable, or $T_{400}$ or $T_{min}$ may be lowered, and the total content is preferably at most 7%. In a case where it is desired to make $T_{400}$ or $T_{min}$ high, for example, at least 97%, preferably neither of $Nb_2O_5$ and $WO_3$ is incorporated.

$Ga_2O_3$ is not essential, but may be incorporated to stabilize the glass, to make n large or for another purpose. When $Ga_2O_3$ is incorporated, its content is preferably at least 1% or at most 20%. If the $Ga_2O_3$ content is less than 1%, the effect of stabilizing the glass may be insufficient, and the content is more preferably at least 2%. If the $Ga_2O_3$ content exceeds 20%, Tg may be high, and the content is more preferably at most 15%, particularly preferably at most 10%.

$Y_2O_3$ is not essential, but may be incorporated to make n large, to suppress devitrification at the time of forming or for another purpose. When $Y_2O_3$ is incorporated, its content is preferably at least 1% or at most 20%. If the $Y_2O_3$ content is less than 1%, the effect of making n large may be insufficient, and the content is more preferably at least 2%. If the $Y_2O_3$ content exceeds 20%, Tg may be high, and the content is more preferably at most 10%, particularly preferably at most 5%.

F is not essential, but may be incorporated to lower Tg or for another purpose. When F is incorporated, its content is preferably at most 3%. If the F content exceeds 3%, n may be small, the glass may be unstable, or vaporization at the time of melting may be remarkable, whereby the striae become intense. In a case where it is desired to make n larger, preferably no F is incorporated.

The glass of the present invention typically comprises the above-described components. However, needless to say, other components may be incorporated within a range where the object of the present invention is achieved.

However, neither of PbO and $Tl_2O$ is preferably incorporated.

Further, FeO is likely to be unavoidably incorporated as an impurity, which is a component to lower $T_{400}$ or $T_{min}$, and its content is preferably at most 0.0001%.

As a preferred embodiment of the glass of the present invention, one consisting essentially of, as represented by mol % based on the following oxides, from 25 to 70% of $B_2O_3$, from 5 to 30% of $La_2O_3$, from 5 to 25% of ZnO, from 1 to 20% of $Ga_2O_3$, from 0 to 15% of $Li_2O$, from 0 to 20% of $GeO_2$, from 0 to 10% of $Y_2O_3$, from 0.1 to 20% of $TeO_2$, and from 0 to 20% of $ZrO_2+In_2O_3+Gd_2O_3+Ta_2O_5$, wherein $B_2O_3+GeO_2$ is from 30 to 70 mol %, may be mentioned.

The optical element in the present invention is typically a lens, a prism or a mirror.

In the process for producing an optical element of the present invention, typically a spherical preform is prepared by a known method of dropping the glass of the present invention in a molten state from a flow outlet of a flow out pipe made of platinum or the like. In such a case, since θ is large, the above-described wet attachment of the molten glass to the outside of the end of the flow outlet is suppressed, whereby the above-described fluctuation in mass of the preform will be reduced.

An optical element having a desired shape is produced from the above preform by a known precision press-molding method.

The lens to be produced by the process for producing an optical element of the present invention is suitable as an object lens or a collimating lens for a visible to near ultraviolet laser in a case where recording or reading on an optical recording medium such as CD, CD-R, CD-RW, DVD or MO is carried out by means of a laser beam having a wavelength of from 400 to 800 nm.

EXAMPLES

Materials were blended so as to obtain glass having the composition shown by mol % in the lines for $B_2O_3$ to FeO in Table 1, put into a crucible made of platinum and melted for one hour at from 1,100 to 1,200° C. At that time, the molten glass was homogenized by stirring for 0.5 hour by means of a stirrer made of platinum. The homogenized molten glass was cast and formed into a plate shape, followed by annealing. Examples 1 to 6 are Examples of the present invention and Example 7 is a Comparative Example.

As the materials, boron oxide, zinc oxide, lithium carbonate, lithium nitrate and zirconium dioxide each being a special grade chemical manufactured by KANTO CHEMICAL CO., INC., lanthanum oxide, yttrium oxide and gadolinium oxide each having a purity of at least 99.9% manufactured by Shin-Etsu Chemical Co., Ltd., special grade gallium oxide manufactured by Rare Metallic Co., Ltd., tellurium dioxide having a purity of at least 99.999% manufactured by Shinko Chemical Co., Ltd. and tantalum oxide having a purity of at least 99.9% manufactured by Kojundo Chemical Laboratory Co., Ltd. were used.

With respect to the obtained glass, Tg (unit: ° C.), the average thermal expansion coefficient α from 100 to 300° C. (unit: ×$10^{-7}$/° C.), $T_{400}$ (unit: %), $T_{min}$ (unit: %), n, the refractive index n' to a light having a wavelength of 405 nm, the Abbe number $v_d$, $T_L$ (unit: ° C.), θ (unit: °) and the angle θ' (unit: °) formed by the glass surface and the platinum plate at the interface between the glass and the platinum plate, after θ was measured by the above-exemplified measuring method and the sample was cooled to room temperature, were measured. "-" in Tables means no measurement was conducted.

θ' is generally smaller than θ from such a reason that the glass shrinks at the time of cooling and the height of the liquid level is reduced, and is likely to be affected by conditions at the time of cooling. Thus, the magnitude of θ does not necessarily agree with the magnitude of θ'.

Methods for measuring Tg, α, n, n', $v_d$ and $T_L$ will be described below.

Tg: A sample processed into a columnar shape having a diameter of 5 mm and a length of 20 mm, was measured at a temperature raising rate of 5° C./min by means of thermal mechanical analyzer TMA8140 (tradename) manufactured by Rigaku Corporation.

α: A sample processed into a columnar shape having a diameter of 5 mm and a length of 20 mm, was measured at a temperature raising rate of 5° C./min by means of thermal mechanical analyzer TMA8140 (tradename) manufactured by Rigaku Corporation.

n: A sample plate having a size of 2 cm×2 cm and a thickness of 1 mm, both sides of which were mirror-polished, was measured by a refractive index measuring apparatus Model 2010 PRISM COUPLER (tradename) manufactured by Metricon Corporation to obtain a refractive index to a light having a wavelength of 633 nm.

n', $v_d$: The glass was processed into a triangular shaped prism having one side of 30 mm and a thickness of 10 mm, which was measured by a precision spectrometer GMR-1 (tradename) manufactured by Kalnew Optical Company.

$T_L$: A 4 mm×4 mm×4 mm glass block was put on a dish made of a Pt alloy (95% Pt and 5% Au), held in an electric furnace at a predetermined temperature which was higher by at least 100° C. than the temperature at which the glass is softened for 5 hours, taken out from the furnace and left at rest. Then, the glass was observed visually or by a microscope of 200 times power, and the lowest temperature among temperatures at which no crystalline component was observed was employed as $T_L$.

manufactured by Osaka Asahi Co., Ltd., zinc oxide having a purity of at least 99.999% manufactured by Kojundo Chemical Laboratory Co., Ltd., and lanthanum oxide having a purity of at least 99.9%, yttrium oxide, boron oxide and gallium oxide manufactured by the same company were used.

With respect to the glasses in Examples 8 to 32, Tg, α, $T_{min}$, n, n' and $v_d$ were measured in the same manner as in Examples 1 to 7. The results are shown in Tables.

TABLE 1

| | Ex. | | | | | | |
|---|---|---|---|---|---|---|---|
| | 1 | 2 | 3 | 4 | 5 | 6 | 7 |
| $B_2O_3$ | 64.5 | 61.5 | 42.5 | 58.5 | 35.5 | 32.5 | 67.9 |
| $La_2O_3$ | 15 | 15 | 13 | 15 | 13 | 13 | 19.4 |
| ZnO | 9.5 | 9.5 | 9.5 | 9.5 | 9.5 | 9.5 | 9.7 |
| $Ga_2O_3$ | 3 | 3 | 8 | 3 | 8 | 8 | 3 |
| $Li_2O$ | 2 | 2 | 8 | 2 | 8 | 8 | 0 |
| $GeO_2$ | 0 | 0 | 0 | 0 | 5 | 5 | 0 |
| $Y_2O_3$ | 4 | 4 | 4 | 4 | 4 | 4 | 0 |
| $TeO_2$ | 2 | 5 | 5 | 8 | 9 | 12 | 0 |
| $ZrO_2$ | 0 | 0 | 5 | 0 | 3 | 3 | 0 |
| $Gd_2O_3$ | 0 | 0 | 2 | 0 | 2 | 2 | 0 |
| $Ta_2O_5$ | 0 | 0 | 3 | 0 | 3 | 3 | 0 |
| FeO | <0.0001 | <0.0001 | <0.0001 | <0.001 | <0.0001 | <0.0001 | <0.0001 |
| Tg | 625 | 610 | 555 | 605 | 557 | 550 | 635 |
| α | 65 | 68 | 78 | 69 | 81 | 85 | 66 |
| $T_{400}$ | 99.8 | 99.1 | 99.0 | 99.7 | 99.6 | 99.4 | 99.9 |
| $T_{min}$ | 99.8 | 99.1 | 99.0 | 99.7 | 99.6 | 99.4 | 99.9 |
| n | 1.72 | 1.73 | 1.80 | 1.74 | 1.82 | 1.84 | 1.73 |
| $v_d$ | 52 | 50 | 43 | — | 41 | 39 | — |
| n' | 1.75 | 1.75 | 1.83 | — | 1.85 | 1.87 | — |
| $T_L$ | 1025 | 1011 | 1119 | 1000 | 1049 | 1020 | 1080 |
| θ | 85 | 90 | 90 | 91 | 104 | 98 | Less than 20 |
| θ' | 68 | 69 | 81 | 83 | 99 | 95 | — |

Further, materials were blended so as to obtain glass having the composition shown by mol % in the lines for $B_2O_3$ to $Na_2O$, $WO_3$ or $Nb_2O_5$ in Tables 2 to 4, put into a crucible made of platinum and melted for one hour at from 1,100 to 1,200° C. At that time, the molten glass was homogenized by stirring for 0.5 hour by means of a stirrer made of platinum. The homogenized molten glass was cast and formed into a plate shape, followed by annealing.

As the materials, special grade boron oxide, zinc oxide, lithium carbonate, lithium nitrate, zirconium dioxide, sodium carbonate, titanium oxide, aluminum oxide, magnesium carbonate, calcium carbonate, strontium carbonate and barium carbonate manufactured by KANTO CHEMICAL CO., INC., lanthanum oxide having a purity of 99.999%, lanthanum oxide having a purity of 99.9%, yttrium oxide and gadolinium oxide manufactured by Shin-Etsu Chemical Co., Ltd., special grade gallium oxide manufactured by Rare Metallic Co., Ltd., tellurium dioxide having a purity of at least 99.999% manufactured by Shinko Chemical Co., Ltd., special grade niobium oxide, tantalum oxide and tungsten oxide

TABLE 2

| | Ex. | | | | | |
|---|---|---|---|---|---|---|
| | 8 | 9 | 10 | 11 | 12 | 13 |
| $B_2O_3$ | 58.5 | 58.5 | 58.5 | 58.5 | 61.5 | 61.5 |
| $La_2O_3$ | 15 | 15 | 15 | 15 | 14 | 16 |
| ZnO | 9.5 | 9.5 | 9.5 | 9.5 | 9.5 | 9.5 |
| $Ga_2O_3$ | 3 | 3 | 3 | 3 | 3 | 3 |
| $Li_2O$ | 5 | 2 | 2 | 2 | 2 | 2 |

TABLE 2-continued

| | Ex. | | | | | |
|---|---|---|---|---|---|---|
| | 8 | 9 | 10 | 11 | 12 | 13 |
| $Y_2O_3$ | 4 | 4 | 4 | 4 | 5 | 3 |
| $TeO_2$ | 5 | 5 | 5 | 5 | 5 | 5 |
| MgO | 0 | 0 | 3 | 0 | 0 | 0 |
| BaO | 0 | 0 | 0 | 3 | 0 | 0 |
| $Na_2O$ | 0 | 3 | 0 | 0 | 0 | 0 |
| Tg | 585 | 585 | 610 | 605 | 615 | 610 |
| α | 73 | 75 | 70 | 72 | 68 | 67 |
| $T_{min}$ | 99.8 | 99.3 | 99.6 | 99.5 | 99.8 | 99.9 |
| n | 1.74 | 1.73 | 1.74 | 1.74 | 1.73 | 1.74 |
| $v_d$ | 50 | — | — | — | — | — |
| n' | 1.76 | — | — | — | — | — |

TABLE 3

| | Ex. | | | | | | | | | |
|---|---|---|---|---|---|---|---|---|---|---|
| | 14 | 15 | 16 | 17 | 18 | 19 | 20 | 21 | 22 | 23 |
| $B_2O_3$ | 62.5 | 60.5 | 58.5 | 58.5 | 59.5 | 58.5 | 58.5 | 58.5 | 58.5 | 61.5 |
| $La_2O_3$ | 15 | 15 | 15 | 15 | 15 | 15 | 15 | 15 | 15 | 13 |
| ZnO | 9.5 | 9.5 | 9.5 | 9.5 | 9.5 | 9.5 | 9.5 | 9.5 | 9.5 | 9.5 |
| $Ga_2O_3$ | 2 | 4 | 3 | 3 | 5 | 6 | 3 | 3 | 3 | 3 |
| $Li_2O$ | 2 | 2 | 2 | 2 | 2 | 2 | 2 | 2 | 2 | 2 |
| $Y_2O_3$ | 4 | 4 | 4 | 4 | 4 | 4 | 4 | 4 | 4 | 4 |
| $TeO_2$ | 5 | 5 | 5 | 5 | 5 | 5 | 5 | 5 | 5 | 5 |
| $Gd_2O_3$ | 0 | 0 | 0 | 0 | 0 | 0 | 0 | 0 | 0 | 2 |
| $Al_2O_3$ | 0 | 0 | 0 | 0 | 0 | 0 | 3 | 0 | 0 | 0 |
| CaO | 0 | 0 | 0 | 3 | 0 | 0 | 0 | 0 | 0 | 0 |
| SrO | 0 | 0 | 3 | 0 | 0 | 0 | 0 | 0 | 0 | 0 |
| $TiO_2$ | 0 | 0 | 0 | 0 | 0 | 0 | 0 | 0 | 3 | 0 |
| $WO_3$ | 0 | 0 | 0 | 0 | 0 | 0 | 0 | 3 | 0 | 0 |
| Tg | 615 | 610 | 605 | 605 | 610 | 605 | 610 | 610 | 610 | 610 |
| α | 67 | 68 | 72 | 72 | 68 | 67 | 67 | 68 | 69 | 69 |
| $T_{min}$ | 99.8 | 99.7 | 98.7 | 99.2 | 99.9 | 99.9 | 99.2 | 99.1 | 99.1 | 99.0 |
| n | 1.73 | 1.74 | 1.74 | 1.74 | 1.74 | 1.74 | 1.73 | 1.75 | 1.75 | 1.73 |
| $ν_d$ | — | — | — | — | — | — | — | — | — | — |
| n' | — | — | — | — | — | — | — | — | — | — |

TABLE 4

| | Ex. | | | | | | | | |
|---|---|---|---|---|---|---|---|---|---|
| | 24 | 25 | 26 | 27 | 28 | 29 | 30 | 31 | 32 |
| $B_2O_3$ | 58.5 | 58.5 | 58.5 | 56.5 | 58.5 | 49 | 49.5 | 44.5 | 35.5 |
| $La_2O_3$ | 15 | 15 | 15 | 15 | 15 | 13 | 15 | 13 | 13 |
| ZnO | 9.5 | 9.5 | 9.5 | 9.5 | 12.5 | 9.5 | 9.5 | 9.5 | 12.5 |
| $Ga_2O_3$ | 3 | 3 | 3 | 8 | 3 | 8 | 15 | 8 | 8 |
| $Li_2O$ | 2 | 2 | 2 | 2 | 2 | 6.5 | 2 | 8 | 8 |
| $GeO_2$ | 0 | 0 | 0 | 0 | 0 | 0 | 0 | 0 | 5 |
| $Y_2O_3$ | 4 | 4 | 4 | 4 | 4 | 4 | 4 | 4 | 4 |
| $TeO_2$ | 5 | 5 | 5 | 5 | 5 | 5 | 5 | 5 | 6 |
| $ZrO_2$ | 0 | 0 | 0 | 0 | 0 | 0 | 0 | 3 | 3 |
| $Gd_2O_3$ | 0 | 0 | 0 | 0 | 0 | 2 | 0 | 2 | 2 |
| $Ta_2O_5$ | 0 | 3 | 0 | 0 | 0 | 3 | 0 | 3 | 3 |
| CaO | 3 | 0 | 0 | 0 | 0 | 0 | 0 | 0 | 0 |
| $Nb_2O_5$ | 0 | 0 | 3 | 0 | 0 | 0 | 0 | 0 | 0 |
| Tg | 610 | 615 | 610 | 600 | 605 | 560 | 595 | 550 | 553 |
| α | 70 | 66 | 68 | 68 | 69 | 74 | 67 | 77 | 81 |
| $T_{min}$ | 99.1 | 99.2 | 98.2 | 99.6 | 99.5 | 99.1 | 99.4 | 99.1 | 99.8 |
| n | 1.74 | 1.76 | 1.77 | 1.74 | 1.74 | 1.78 | 1.76 | 1.80 | 1.82 |
| $ν_d$ | — | — | 45 | 49 | 49 | 45 | — | 44 | 42 |
| n' | — | — | 1.80 | 1.77 | 1.77 | 1.80 | — | 1.82 | 1.85 |

The entire disclosure of Japanese Patent Application No. 2003-370522 filed on Oct. 30, 2003 including specification, claims and summary is incorporated herein by reference in its entirety.

What is claimed is:

1. An optical glass consisting essentially of, as represented by mol %,
   from 25 to 70% of $B_2O_3$,
   from 5 to 30% of $La_2O_3$,
   from 5 to 25% of ZnO,
   from 1 to 20% of $Ga_2O_3$,
   from 0 to 15% of $Li_2O$,
   from 0 to 20% of $GeO_2$,
   from 0 to 10% of $Y_2O_3$,
   from 0.1 to 20% of $TeO_2$, and
   from 0 to 20% of $ZrO_2+In_2O_3+Gd_2O_3+Ta_2O_5$, wherein $B_2O_3+GeO_2$ is from 30 to 70 mol %, and
   the optical glass has an internal transmittance to a light having a wavelength of 400 nm of at least 90% as calculated in a thickness of 1 mm.

2. The optical glass according to claim 1, wherein said optical glass has a glass transition point of at most 650° C. and a refractive index to a light having a wavelength of 633 nm being at least 1.70.

3. The optical glass according to claim 1, wherein said optical glass has an Abbe number of at least 35.

4. A process for producing an optical element comprising the optical glass as defined in claim 1, comprising:
   dropping the optical glass in a molten state from a flow outlet of a flow out pipe comprising platinum or a platinum alloy to form a perform, and
   subjecting said preform to precision press-molding to form the optical element.

5. The optical glass according to claim 1, wherein the internal transmittance to a light having a wavelength of 400 nm is at least 95%.

6. The optical glass according to claim 1, wherein the internal transmittance to a light having a wavelength of 400 nm is at least 98%.

7. The optical glass according to claim 1, wherein said optical glass has a minimum internal transmittance to a light having a wavelength of from 400 to 800 nm, as calculated in a thickness of 1 mm, of at least 97%.

8. The optical glass according to claim 1, wherein said optical glass has a minimum internal transmittance to a light having a wavelength of from 400 to 800 nm, as calculated in a thickness of 1 mm, of at least 98%.

9. The optical glass according to claim 1, wherein said optical glass has a minimum internal transmittance to a light having a wavelength of from 400 to 800 nm, as calculated in a thickness of 1 mm, of at least 99%.

10. The optical glass according to claim 2, wherein the refractive index to a light having a wavelength of 633 nm is at least 1.78.

11. The optical glass according to claim 2, wherein the glass transition point is at most 630° C.

12. The optical glass according to claim 2, wherein the glass transition point is at most 560° C.

13. The optical glass according to claim 3, wherein the Abbe number is at least 40.

14. The optical glass according to claim 3, wherein the Abbe number is at least 55.

\* \* \* \* \*